Patented Jan. 31, 1939

2,145,303

UNITED STATES PATENT OFFICE 2,145,303

ADHESIVE

Winfrid Hentrich, Dusseldorf-Reisholz, and Rudolf Köhler, Dusseldorf, Germany, assignors to Henkel & Cie., G. m. b. H., Dusseldorf-Halthausen, Germany, a corporation of Germany No Drawing. Application April 21, 1938, Serial No. 203,360. In Germany April 23, 1937

16 Claims. (Cl. 260—152)

This invention relates to a new class of compounds producible from cellulose and especially useful as adhesives, thickening and textile treating agents; and to methods of producing the same.

More particularly the invention relates to water soluble or water absorbable cellulose derivatives obtained by treating cellulose in an alkaline medium, especially alkali cellulose, with glycol-halogen-hydrines of the general formula $$X\text{---}(CH_2CH_2O)_nCH_2CH_2OH$$

wherein X denotes a halogen atom and $n$ is a number less than six, preferably from 1 to 4, inclusive.

It has been known for some years that certain cellulosic derivatives are useful in the textile treating arts. It has also been known that certain of these cellulosic derivatives have adhesive qualities making them useful in many fields where surface adhesion proves valuable.

The compounds of the present invention provide a new class of cellulose derivatives. These compounds possess the surprising quality of water solubility, especially in an alkaline medium, forming an aqueous colloidal solution. The concentration of the solution may be varied within a wide range providing a sticky, highly adhesive mass or a colloidal-like solution useful as thickening agents, textile treating agents and the like. The sticky mass can be produced merely by allowing the product to swell in water, the solution being most easily prepared with the aid of an alkali.

An object of the present invention is to produce a new class of cellulose derivatives. A further object is to disclose a method for producing the new cellulose derivatives.

Another object of the present invention is to produce a new class of water soluble or absorbable cellulose derivatives which are useful as adhesives, thickening agents, textile treating agents and for like purposes. These new products are low in cost, economical in use, stable against deterioration, have excellent adhesive power, are marketable in a convenient form and are readily put in condition for use by dissolving in water.

The glycol-halogen-hydrines of the present invention may be procured in a known manner, for example, by the reaction of glycols with halogen-hydrines and saturating the reaction product with hydrochloric acid. If one uses glycols with glycol chlorohydrin, mixtures with the following structures are procured:

$ClCH_2CH_2OCH_2CH_2OH$;

$ClCH_2CH_2OCH_2CH_2OCH_2CH_2OH$;

$ClCH_2CH_2OCH_2CH_2OCH_2CH_2OCH_2CH_2OH$, etc.

This mixture may be reacted with cellulose in an alkaline medium without subjecting it to any prior separation. The reaction may be effectively carried forward in the presence of organic solvents such as acetone, at ordinary temperatures.

The process of the present invention is not limited to any special sequence of procedural steps, for it may be carried out in a number of ways, the herein disclosed methods being illustrative only. For instance, the process may be carried forward in a step by step method, such as by reacting the cellulose with a part of the halogen compound and then reacting with the reaction product other portions of the halogen compound.

Although the present invention is not limited to any particular alkaline agents or glycol halogen-hydrines, the following example will serve to illustrate one of the preferred methods of making the new compounds.

*Example*

One mole of glycolchlorohydrin and 2 moles of glycol are heated to a temperature of 140° for a period of 24 hours. Thereupon the masses are saturated with gaseous hydrochloric acid and heated to a temperature of 100°. The reaction product is distilled and that portion distilling between the temperature range of 150°–250° C. is collected.

Twenty parts by weight of this distillate, which consists essentially of a mixture of the above compounds whose formula and structure have been hereinbefore set out, is dissolved in 50 parts by weight of acetone. Eight parts by weight of cellulose is mercerized by a treatment with fifty parts by volume of concentrated sodium hydroxide. The excess sodium hydroxide is separated out and the mercerized cellulose is then suspended in 150 parts by weight of acetone. To this mixture is added the above-described acetone solution of the halogen compounds. This mixture is shaken for a period of 8 hours. The treatment of the cellulose is preferably repeated several times. In this manner one obtains a water absorbing cellulose derivative which goes into solution in the presence of alkali and which may be used as an adhesive in paste form or in the form of a solution.

The present invention has provided a new class of compounds comprising the reaction products of cellulose in an alkaline medium with the reaction products of glycols and glycol-halogen-hydrines. These compounds are water soluble and possess surprising properties making them useful as adhesives, thickening agents, textile treating agents and for like purposes wherever surface adhesion is desired.

It should be understood that the present invention is not limited to the specific compounds and processes herein mentioned but that it extends to all equivalent compounds and processes which one skilled in the art would consider within the scope of the appended claims.

We claim:

1. As new compounds, the reaction products of an alkali cellulose with compounds of the general formula X—(CH₂CH₂O)ₙCH₂CH₂OH, where X is a halogen and $n$ a number less than 6.

2. The process of producing adhesives, thickening agents, textile treating agents and the like which comprises reacting a glycolhalogenhydrin with glycol, saturating the reaction product with hydrochloric acid, and reacting the product with cellulose in an alkaline medium.

3. The process of producing water soluble colloidal-like cellulose derivatives which comprises reacting alkali cellulose in an alkaline medium with compounds of the general formula

where X is a halogen and $n$ a number less than 6.

4. The process of producing adhesives which comprises heating glycolchlorohydrin with glycol for a period of 24 hours at about 140° C., saturating the product with gaseous hydrochloric acid, heating the saturated product to 100° C., frictionally distilling said saturated product and collecting the fraction distilling over between 150°–250° C., dissolving the said fraction in acetone and agitating with mercerized cellulose suspended in acetone until the reaction is complete.

5. The process of producing adhesives which comprises reacting glycolchlorohydrin with glycol, dissolving the product in acetone, agitating said dissolved product with the reaction product of cellulose and sodium hydroxide suspended in acetone, until the reaction is complete.

6. The process of producing adhesives which comprises reacting cellulose in an alkaline memium with compounds of the general formula X—(CH₂CH₂O) CH₂CH₂OH where X is a halogen, said reaction being facilitated by agitating the reagents dissolved in organic solvents for about 8 hours at about room temperatures.

7. New adhesives comprising an aqueous alkaline solution of the reaction product of alkali cellulose with the reaction product of glycol with a glycol-halogen-hydrine.

8. New adhesives composed, at least in part, of an aqueous colloidal solution of the reaction product of cellulose in an alkaline medium with compounds of the general formula

X—(CH₂CH₂O)ₙCH₂CH₂OH where X is a halogen and $n$ a number less than 6.

9. New compositions of matter suitable for use as adhesives, thickening agents, textile treating agents and the like composed at least in part of the water soluble reaction product of alkali cellulose with the reaction product of glycols and glycol-halogen-hydrines capable of being put in condition for use by merely dissolving in water to produce dilute colloidal-like solutions.

10. New compounds comprising the reaction products of cellulose in an alkaline medium with the reaction product of glycols and glycol-halogen-hydrines, said reaction product being reacted with glycol-halogen-hydrines.

11. The process of producing water soluble cellulose derivatives which comprises reacting cellulose in an alkaline medium with the reaction product of glycols and glycol-halogen-hydrines, said reaction product being reacted with halogen-hydrines.

12. The process of producing water soluble colloidal-like cellulose derivatives suitable for use as adhesives, thickening agents, textile treating agents and the like which comprises reacting alkali cellulose with compounds of the general formula X—(CH₂CH₂O)ₙCH₂CH₂OH where X is a halogen and $n$ a number less than 6, said reagents being dissolved in organic solvents.

13. The process of producing adhesives which comprises reacting alkali cellulose in an alkali medium with compounds of the general formula X—(CH₂CH₂O)ₙCH₂CH₂OH where X is a halogen and $n$ a number less than 6.

14. An adhesive composed of an aqueous colloidal solution of the reaction product of alkali cellulose with compounds of the general formula X—(CH₂CH₂O) CH₂CH₂OH where X is a halogen.

15. An adhesive composed of an aqueous colloidal solution of the reaction product of alkali cellulose with compounds of the general formula X—(CH₂CH₂O)ₙCH₂CH₂OH where X is a halogen and $n$ a number of from 1 to 4.

16. A new compound, the reaction product of cellulose in an alkali medium with the reaction product of glycolchlorohydrin and glycol, said glycol and glycolchlorohydrin reaction product being saturated with hydrochloric acid.

WINFRID HENTRICH.
RUDOLF KÖHLER.

CERTIFICATE OF CORRECTION.

Patent No. 2,145,303. January 31, 1939.

WINFRID HENTRICH, ET AL.

It is hereby certified that error appears in the printed specification of the above numbered patent requiring correction as follows: Page 2, first column, line 27, claim 4, for "frictionally" read fractionally; line 39-40, claim 6, for "memium" read medium; and that the said Letters Patent should be read with this correction therein that the same may conform to the record of the case in the Patent Office.

Signed and sealed this 14th day of March, A.D. 1939.

Henry Van Arsdale.

(Seal) Acting Commissioner of Patents.